Nov. 16, 1954  C. L. ZITZA ET AL  2,694,583
LATERALLY AND ANGULARLY ADJUSTABLE MANIFOLD MOUNTING
Filed Aug. 4, 1949  2 Sheets-Sheet 1
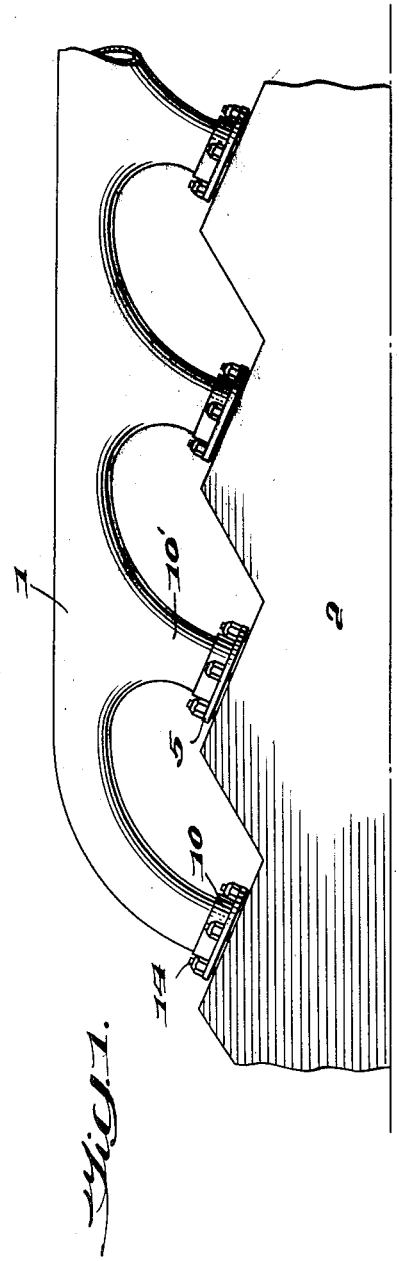
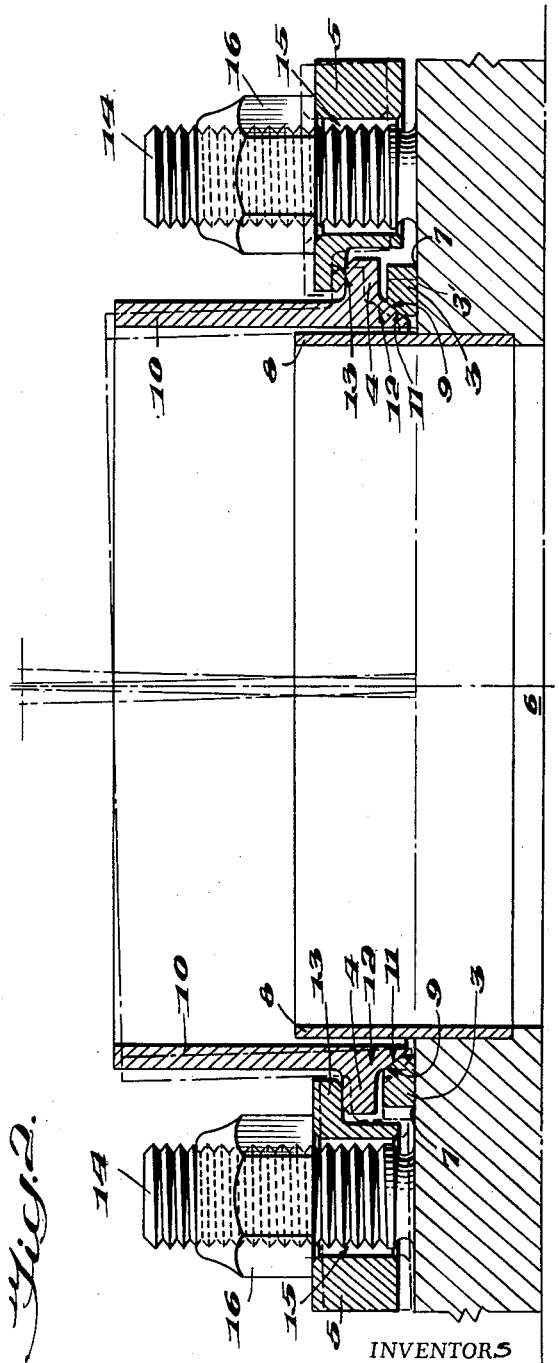
INVENTORS
CURT L. ZITZA,
DELBERT A. KINTZ,
BY
ATTORNEY

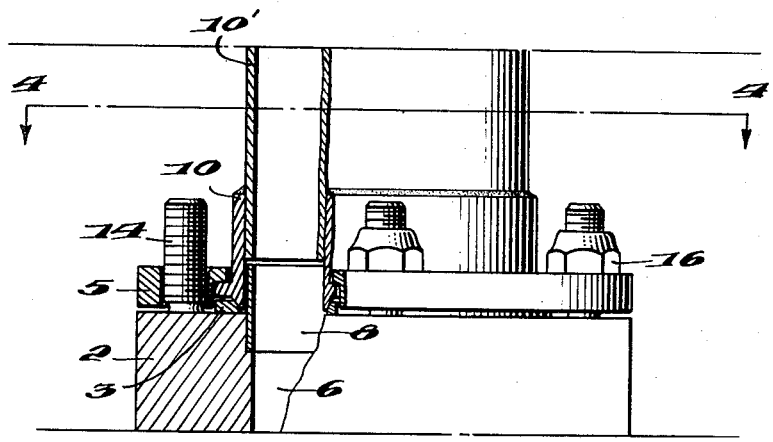
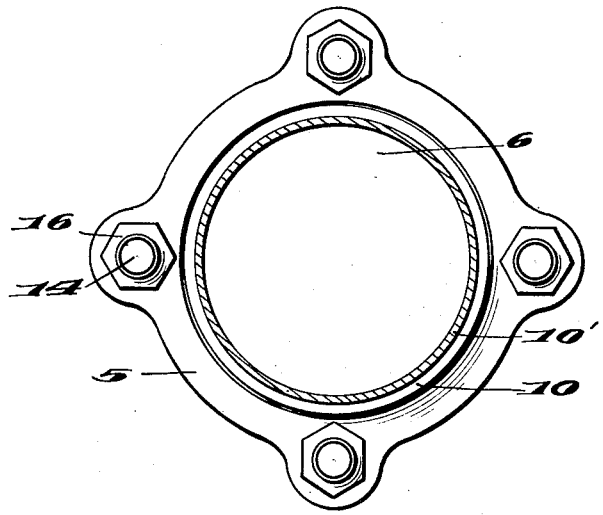

United States Patent Office 2,694,583
Patented Nov. 16, 1954

2,694,583

LATERALLY AND ANGULARLY ADJUSTABLE MANIFOLD MOUNTING

Curt L. Zitza, Baltimore, and Delbert A. Kintz, Towson, Md., assignors to The Glenn L. Martin Company, Middle River, Md., a corporation of Maryland Application August 4, 1949, Serial No. 108,626

1 Claim. (Cl. 285—25)

This invention relates to an arrangement for mounting a multiple port exhaust manifold on an engine.

The relatively low endurance of exhaust manifolds has presented a foremost problem to aircraft designers in the past. Due to manufacturing processes, these parts are subject to certain tolerances or variations in the shape and dimensions. While these tolerances do not prevent a mounting by the conventional means, they require considerable forcing when bringing the branches in contact with the mounting seat. Certain stresses are thereby set up. The hard, brittle, heat-resistant metal used will lose strength but retain most of its other properties when subjected to high temperatures. The above-mentioned stresses then become an unsurmountable factor causing the manifold to crack, necessitating frequent maintenance and repair.

It is found, by eliminating stresses developed in an exhaust manifold due to the conventional mounting, the dependability of said manifold will be greatly enhanced. With this idea in mind, the invention is submitted.

It is an object of this invention to provide a self-aligning device for mounting a manifold on an engine.

Another object of this invention is to prolong the life of a manifold by relieving stresses caused by forced mountings.

Another object of this invention is to effect a leak-proof connection.

A further object of this invention is to enable successful mounting despite manifold tolerances.

Further and other objects will become apparent from the description of the accompanying drawings which form a part of this disclosure and in which like numerals refer to like parts.

In the drawings:

Figure 1 is a fragmentary side view of the manifold attached to the exhaust ports.

Figure 2 is an enlarged sectional view through the exhaust mounting showing the self-aligning arrangement.

Figure 3 is a fragmentary side view showing the assembly and installation of one branch of the manifold.

Figure 4 is a sectional view taken on the line 4—4 of Figure 3.

The drawings show an exhaust manifold 1 having a plurality of branches 10' adapted to be rigidly mounted on engine 2 with the individual branches in communication with the corresponding sleeve 8 fitted in exhaust port 6 formed in the engine block. The self-aligning exhaust mounting interposed between manifold 1 and engine 2 constitutes several individual parts. A seating ring 3, a hold-down flange 4 and a hold-down ring 5 are the principal components of the mounting. The seating ring 3 completely encircles exhaust port 6. The ring has a flat face 3' contacting mounting seat 7 surrounding exhaust port 6, and a conical surface 9 engaging spherical seating surface 11 formed on tip portion 12 of end member 10, which forms the end portion of branch member 10'. Near tip portion 12, the end member is provided with a hold-down flange 4, contacted by an inwardly extending flange 13 of hold-down ring 5 which surrounds exhaust port 6. A necessary number of studs 14, spaced circumferentially around exhaust port 6, extend loosely through holes 15 in hold-down ring 5. Studs 14 have threads so that an ordinary nut 16 may be used to fix branch member 10' in its desired position.

The self-aligning manifold mounting described herein is shown in Figure 2. Two positions, one centered and in alignment, represented by solid lines, the other off center and angularly displaced, represented by phantom lines, show diagrammatically the method by which a connection is made. The seating ring 3 is movable over mounting seat 7, thereby adjusting itself to seat end member 10. Complete communication is made between exhaust port 6 and end member 10 when seating ring 3, interposed between the two, rests on mounting seat 7 and makes a line contact with spherical surface 11 of tip portion 12. To secure the parts in fluid-tight relationship, a hold-down flange 4 on end member 10 contacts hold-down ring 5 through flange 13. Necessary clearance is maintained between the parts to allow adjustments without binding. Holes 15 in hold-down ring 5 are sufficiently larger than studs 14 to allow flange 13 to make smooth contact with the angular position of end member 10. This clearance permits hold-down ring 5 to move, with respect to studs 14, higher on one side of exhaust port 6 than on the other, as shown in dotted lines on Figure 2. A nut 16 is then screwed on each stud 14, securing hold-down ring 5 in contact with hold-down flange 4, thereby effecting a fluid-tight connection with the end member 10 and exhaust port 6.

The exhaust mounting is self-adjusting in both lateral and angular misalignment. All stresses that might have originated, due to securing end member 10 to mounting seat 7 under a condition of misalignment, will therefore be eliminated.

It is to be understood that certain changes, alterations, modifications, and substitutions can be made without departing from the spirit and scope of the appended claim.

We claim as our invention:

A manifold mounting for an engine having a plurality of spaced exhaust ports and a substantially flat mounting seat surrounding each of said exhaust ports, a seating ring surrounding each said exhaust port with a substantially flat surface and a conical surface faced generally inwardly, said flat surface mating said flat mounting seat so as to allow for lateral movement of said seating ring relative to said exhaust port, an exhaust manifold having a plurality of branch members, said branch members having spherical tip portions which face generally away from the axes of said branch members, said spherical tip portions contacting said conical surfaces of said seating rings, a hold-down flange laterally extending circumferentially around each said branch member near its tip portion and having a substantially flat bearing surface facing away from said mounting seat and lying in a plane generally normal to said branch axis, a hold-down ring surrounding each said exhaust port and having an inwardly extending portion whose central opening is substantially larger than the maximum outside dimension of the associated branch member, said ring loosely surrounding the associated branch member and mating with said bearing surface of said hold-down flange whereby to permit limited lateral movement of said hold-down ring relative to said branch member, a plurality of studs spaced circumferentially around said exhaust ports and secured to said engine, said hold-down rings having a plurality of generally cylindrical openings formed therein larger than and loosely receiving said studs and permitting limited angular or lateral movement of said hold-down rings so as to apply a distributed hold-down force on said branch member flanges irrespective of angular and lateral misalignment with said exhaust ports, and means threadedly engaging said studs and contacting said hold-down rings for applying a force on said hold-down rings for securing said hold-down rings, said seating rings and said branch members in position providing a substantially equally fluid-tight connection between the manifold and the exhaust port at each of said branches.

References Cited in the file of this patent

UNITED STATES PATENTS

| Number | Name | Date |
|---|---|---|
| 174,475 | Carleton | Mar. 7, 1876 |
| 291,773 | Reilly | Jan. 8, 1884 |
| 1,024,560 | Dale | Apr. 30, 1912 |
| 1,309,963 | Schneider | July 15, 1919 |
| 1,525,647 | Haughey | Feb. 10, 1925 |
| 2,337,038 | Fentress | Dec. 21, 1943 |
| 2,502,365 | Bard | Mar. 28, 1950 |

FOREIGN PATENTS

| Number | Country | Date |
|---|---|---|
| 315,985 | Great Britain | July 25, 1929 |